US012741417B2

(12) United States Patent
Jo et al.

(10) Patent No.: US 12,741,417 B2
(45) Date of Patent: Sep. 22, 2026

(54) VAT FOR 3D PRINTERS HANDLING HIGH VISCOSITY RESINS

(71) Applicant: 3D CONTROLS CO., LTD., Busan (KR)

(72) Inventors: Kwangho Jo, Busan (KR); Sangkyu Lee, Suwon-si (KR); Yeonseong Jung, Busan (KR)

(73) Assignee: 3D CONTROLS CO., LTD., Suwon-si (KR)

( * ) Notice: Subject to any disclaimer, the term of this patent is extended or adjusted under 35 U.S.C. 154(b) by 24 days.

(21) Appl. No.: 18/579,365

(22) PCT Filed: Jul. 6, 2022

(86) PCT No.: PCT/KR2022/009737
§ 371 (c)(1),
(2) Date: Jan. 14, 2024

(87) PCT Pub. No.: WO2023/287099
PCT Pub. Date: Jan. 19, 2023

(65) Prior Publication Data

US 2024/0336009 A1 Oct. 10, 2024

(30) Foreign Application Priority Data

Jul. 14, 2021 (KR) ........................ 10-2021-0092387

(51) Int. Cl.

| | |
|---|---|
| ***B29C 64/255*** | (2017.01) |
| ***B29C 64/106*** | (2017.01) |
| ***B29C 64/245*** | (2017.01) |
| ***B29C 64/295*** | (2017.01) |

(Continued)

(52) U.S. Cl.
CPC .......... *B29C 64/255* (2017.08); *B29C 64/245* (2017.08); *B29C 64/295* (2017.08); *B29C 64/321* (2017.08); *B29C 64/357* (2017.08); *B29C 64/106* (2017.08)

(58) Field of Classification Search
CPC ... B29C 64/255; B29C 64/245; B29C 64/295; B29C 64/324; B29C 64/357; B29C 64/106; B29C 64/124; B29C 64/188; B29C 64/214; B33Y 10/00; B33Y 30/00
See application file for complete search history.

(56) References Cited

U.S. PATENT DOCUMENTS 6,799,959 B1 * 10/2004 Tochimoto .............. B29C 64/35
425/375
10,507,549 B2 * 12/2019 Buller ..................... B22F 10/20
(Continued)

FOREIGN PATENT DOCUMENTS

KR 10-2253316 B1 5/2021

*Primary Examiner* — Nahida Sultana
(74) *Attorney, Agent, or Firm* — Quantum Patent Law Firm; Seongyoune Kang

(57) ABSTRACT

The present invention relates to a vat for a three dimensional printer for handling high viscosity resin, which may include: a first vat portion including a resin receiving space and a piston member for pushing resin received in the resin receiving space upward through at least one hole formed in a cover portion; and a second vat portion disposed at one side of the first vat portion and including a fabrication platform for supporting a structure fabricated using resin supplied from the first vat portion.

4 Claims, 9 Drawing Sheets

(51) Int. Cl.
*B29C 64/321* (2017.01)
*B29C 64/357* (2017.01)

(56) References Cited

U.S. PATENT DOCUMENTS

| | | | | |
|---|---|---|---|---|
| 2009/0068376 | A1* | 3/2009 | Philippi | B29C 64/214<br>427/532 |
| 2012/0201960 | A1* | 8/2012 | Hartmann | B33Y 50/02<br>427/256 |
| 2017/0274590 | A1* | 9/2017 | Okazaki | B22F 12/222 |
| 2024/0075687 | A1* | 3/2024 | Lee | A61C 13/08 |
| 2024/0190073 | A1* | 6/2024 | Schmidt-Petersen | B29C 64/245 |

* cited by examiner

VAT FOR 3D PRINTERS HANDLING HIGH VISCOSITY RESINS

CROSS-REFERENCE TO RELATED APPLICATIONS

This patent application is a U.S. national stage application of International Application No. PCT/KR2022/009737, filed Jul. 6, 2022, and the entire contents of which are incorporated herein by reference, which claims priority to KR 10-2021-0092387, filed Jul. 14, 2021, and the entire contents of which are incorporated herein by reference.

TECHNICAL FIELD

The present invention relates to a vat for three-dimensional printers for handling high viscosity resins, and more specifically to a vat for three-dimensional printers with an improved material feeding method for effectively leveling high viscosity materials.

BACKGROUND ART

In general, top-down 3D printers are built by irradiating a light source from the top of a resin filled in a vat to cure it, and while the cured material is fixed on the top surface of the fabrication platform, the Z-axis drive moves in the downward direction while the next layer of material is stacked in the upward direction.

However, among top-down 3D printers, 3D printers that use ceramics have a significantly higher failure rate due to the high viscosity of ceramics, resulting in a high defect rate.

Furthermore, in the case of 3D printers that use ceramic-containing resins, the resin will always end up on the back of the blade, which is opposite to the blade's direction of travel, as the blade reciprocates in both directions to level the resin. At this time, the resin on the back of the blade falls off the blade due to the movement of the blade to level the material, causing it to cure higher than the normal height of the material layer. As a result, the highly hardened material layer collides with the reciprocating blade for the next layer to be stacked, causing cracks to form and reducing the completeness of the product.

Therefore, as described above, there is a need to develop technologies to solve the shortcomings of top-down 3D printers that produce products by stacking high-viscosity materials while reciprocating in both directions.

DISCLOSURE

Technical Problem

The present invention is proposed to solve the above problems, and the object of the present invention is to provide a three-dimensional printer that can effectively level the surface of a resin in a three-dimensional printer that handles a highly viscous resin, thereby improving the manufacturing completeness of a product.

Technical Solution

In order to address the challenges described above, a vat for three-dimensional printers handling a high-viscosity resin according to one embodiment of the present invention may include a first vat portion including a resin receiving space and a piston member for pushing resin received in the resin receiving space upward through at least one hole formed in the cover portion; and a second vat portion including a fabrication platform disposed at one side of the first vat portion and supporting a structure fabricated using resin supplied from the first vat portion.

According to other features of the invention, the piston member may comprise a base formed in the form of a plate having a cross-sectional area equal to the area of the first vat portion and supporting a resin received in the resin receiving space; and a drive shaft connected to a bottom portion of the base for raising and lowering the base to a height above the bottom surface of the cover portion.

According to another feature of the present invention, the first vat portion and the second vat portion may further include a wall disposed as a boundary between the first vat portion and the second vat portion that is lower than the height of the vat portion enclosure, and a blade portion that reciprocates between one side of the vat portion and the other side of the vat portion with a DLP focal length fixed on a top surface of the wall.

According to another feature of the present invention, the blade portion includes a first blade and a second blade including a blade edge surface inclined at a predetermined angle in a direction symmetrical to each other, and a heating member may be disposed on the blade edge surface extending along a longitudinal direction of the blade edge surface to heat the resin applied or recovered during the blading process of the blade portion.

According to another feature of the invention, the first blade feeds resin ejected from the hole onto a fabrication platform provided in the second vat portion, and the second blade is capable of recovering any residual resin applied and cured by the blade into a hole formed in the upper side of the first vat portion.

According to another feature of the present invention, the cover portion may be formed as a multilayer structure comprising a base portion; and a slidable portion disposed on top of the base portion.

Specific details of other embodiments are included in the detailed description and drawings.

Advantageous Effects

The present invention can effectively feed and recover material during the process of blading high viscosity resin by a pair of tilt blades including a heating member.

The present invention can simplify the structure of printers that handle higher viscosity resins by adapting a water bath that utilizes a piston member to feed material and store recovered material to a 3D printer.

The present invention can minimize bubbles on the surface of the material by performing the blading operation by temporarily raising the high-viscosity resin as the blades intersect along the direction of travel.

Since the two blades are tilted in different directions to apply and recover material, the present invention eliminates the need for a separate material recovery section, which simplifies the structure and can improve the productivity of 3D printers.

The present invention can speed up the fabrication of articles because the supply and recovery of material occurs at once when the top surface of the material is reciprocated by the two blades in a single pass, with the first blade applying the material and the second blade reapplying and recovering the material.

Furthermore, the present invention can improve market competitiveness by minimizing product manufacturing failures.

The effects of the present invention are not limited by the above examples, and many more are included herein.

MODE FOR INVENTION

The following description is merely illustrative of the principles of the invention. Therefore, those skilled in the art may invent various devices embodying the principles of the invention and falling within the concepts and scope of the invention, although not specifically described or illustrated herein. Furthermore, all conditional terms and embodiments enumerated herein are expressly intended solely for the purpose of enabling the concepts of the invention to be understood in principle, and are to be understood as not limiting to the embodiments and conditions specifically enumerated as such.

Also, in the following description, ordinal expressions such as first, second, etc. are intended to describe objects that are equivalent and independent of each other and should be understood to have no main/sub or master/slave implications in that order.

The above objects, features and advantages will become more apparent from the following detailed description with reference to the accompanying drawings, which will enable one of ordinary skill in the art to practice the technical ideas of the invention with ease.

Each of the features of the various embodiments of the present invention may be combined or combined with each other in part or in whole, and as will be fully appreciated by those skilled in the art, various interlocking and operational arrangements are technically possible, and each embodiment may be practiced independently of or in conjunction with each other.

Hereinafter, various embodiments of the present invention will be described in detail with reference to the accompanying drawings.

Figure 1:
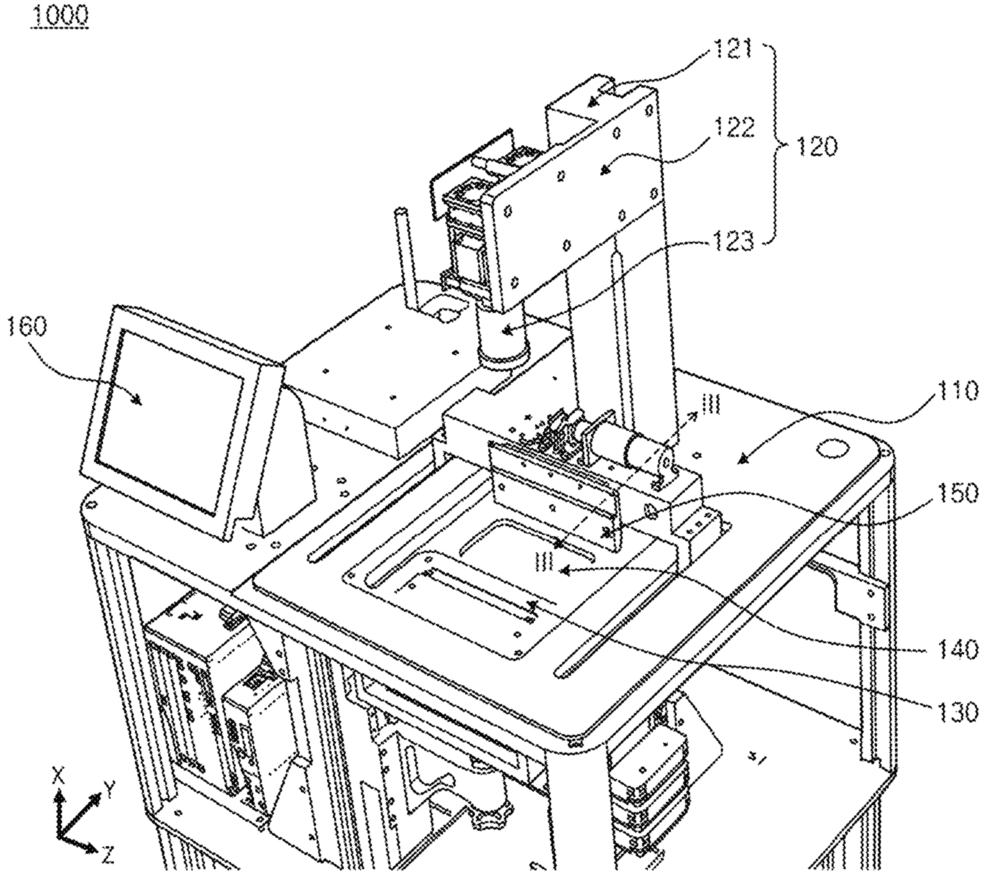
FIG. 1 is an illustration of a three-dimensional printer according to one embodiment of the present invention.

FIG. 1 is an example diagram illustrating the operation of a three-dimensional printer according to one embodiment of the present invention.

The three-dimensional printer 1000 of the present invention is a top-down printer that applies resin to a fabrication platform while the blades reciprocate in a left and right direction, and layer by layer builds the structure. The three-dimensional printer 1000 of the present invention is based on the production of dental parts (e.g., small parts such as teeth, dental implants, etc.), but due to the characteristics of a top-down three-dimensional printer, rather large and heavy structures can also be produced.

Referring to FIG. 1, a three-dimensional printer 1000 includes a base plate 110, a vat portion 130 secured to a first region of said base plate 110, a light-curing portion 120 disposed on one side of said vat portion 130 to top-cure a high-viscosity resin received in a first region of the vat portion 130, a fabrication platform 140 on which the resin cured by the light-curing portion 120 is deposited layer by layer, and a blade portion 150 comprising a pair of blades for applying or recovering said high viscosity resin. The three-dimensional printer may further include a display portion 160 disposed in a first region of the base plate 110, wherein all operations of the three-dimensional printer can be observed and controlled.

Referring to FIG. 1, the base plate 110 is a configuration that refers to the top surface of the three-dimensional printer, and a plurality of configurations may be arranged. For example, in one area of the base plate 110, a display device may be disposed that displays a screen for controlling the 3D printer. Also, a linear actuator may be disposed on the base plate 110 for controlling a vertical distance of the light curing portion 120 that cures the resin.

The vat portion 130 is a water bath that receives a high viscosity resin. Here, the resin of the present invention is a highly viscous material containing zirconia ($ZrO_2$). The viscosity of the resin will vary depending on the amount of zirconia ($ZrO_2$), but it is preferably understood that it is generally very viscous compared to resins that do not contain zirconia ($ZrO_2$). Resins may be referred to herein as light-cured resins or photopolymerized materials.

On the other hand, as the three-dimensional printer 1000 of the present invention is suitable for making dental products, the particles of zirconia ($ZrO_2$) used are characterized in that they are made of a mixture of tetragonal shaped particles and cubic shaped particles. When light passes through zirconia with many tetragonal particles, there is a lot of scattering of light (hereinafter referred to as "light is confidently directed horizontally"), which reduces transparency.

On the other hand, when light passes through cubic particles, the light passes straight through without scattering (hereinafter referred to as "light diffusion in the vertical direction"), so it appears more transparent and is characterized by excellent aesthetics. Therefore, materials containing more cubic particles than tetragonal particles are suitable as dental materials because they are more transparent and can realize a similar appearance to natural teeth.

The light curing portion 120 is configured to cure a high viscosity light curing resin received within the vat portion 130 and is disposed extending vertically on one side of the vat portion. More specifically, the light curing portion 120 may include a linear actuator 121 (hereinafter referred to as a "fixed axis") disposed on one side of the vat portion 130, a support block 122 fixed to the fixed axis and reciprocating in the X-axis direction (hereinafter referred to as the vertical direction), and an optical lens 123 disposed on an upper portion of the fabrication platform 140 and irradiating ultraviolet (UV) light in a downward direction onto a region corresponding to the fabrication platform 140, as shown in FIG. 1.

In addition, the light curing portion 120 may further include a servo motor or a stepping motor that receives a position value from a computing device by a network communication network. Accordingly, the support block 122 of the light curing part can be moved linearly in an upward and downward direction along the side of the fixed axis 121.

The fabrication platform 140 is a configuration in which a solid material is stacked layer by layer in which a liquid light-curing resin is cured by a photopolymerization reaction (also known as a "degradation reaction") by a UV laser beam irradiated from above or a patterned ultraviolet image (DLP). At this time, an optical path is formed between the fabrication platform 140 and the optical lens 123, which is the path through which the UV LED is irradiated.

The blade portion 150 comprises a pair of tilt blades in a configuration that is tilted at a predetermined angle from side to side and operates to flatten material in one direction only. Here, the pair of tilt blades comprises right triangular blades having a tilted shape with the faces of the blades facing each other tilted at an angle symmetrical to each other, and the edge faces tilted at the predetermined angle comprise heating elements for heating the high viscosity resin. This will be described in more detail later.

Further, it is preferably understood that the blade portion 150 is fixed to a blade transfer block and moved in the Y-axis direction. The blade transfer block is configured to hold the blade portion 150 and is movable in the Y-axis direction by being coupled to a chain coupled to a gear disposed on one side of the base plate 110.

The blade portion 150 may also be referred to as the "tilted blades portion" in the present invention. A more detailed description of the blade portion 150 will be described below with reference to FIG. 5.

Figure 2:
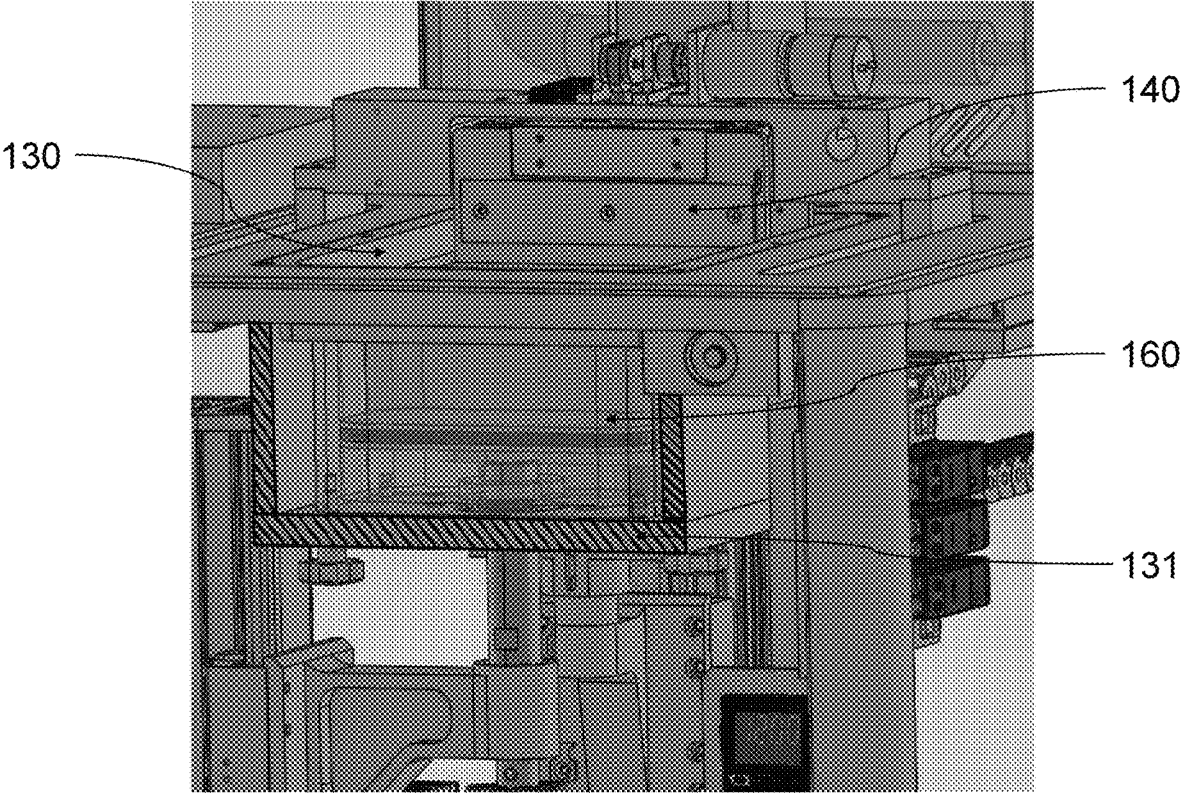
FIG. 2 is an illustration of a projection of the interior of a first vat portion of a vat for a three-dimensional printer, according to one embodiment of the present invention.
Figure 3:
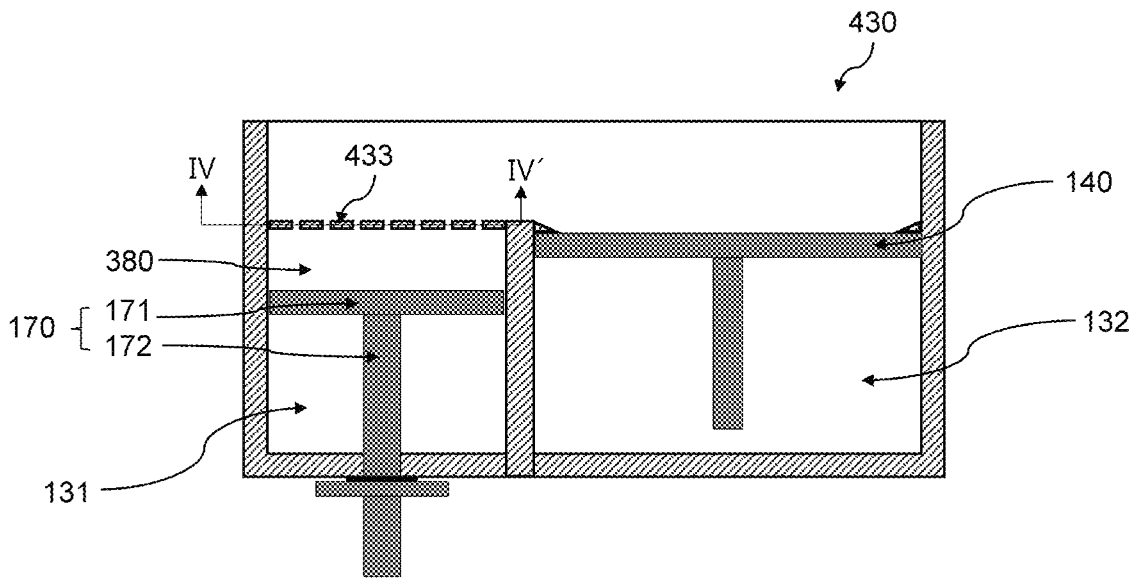
FIG. 3 is a cross-sectional view of a vat portion for a three-dimensional printer, according to one embodiment of the present invention.

FIG. 2 is an exemplary view of the interior of a first vat portion of a vat for a 3D printer according to one embodiment of the present invention. FIG. 3 is a cross-sectional view of a vat for a three-dimensional printer according to one embodiment of the present invention.

Referring to FIGS. 2 and 3, the vat portion 130 may include a first vat portion 131 and a second vat portion 132.

The first vat portion 131 is configured to comprise a piston member 170 that pushes the resin contained in the resin receiving space 380 upward through at least one hole formed in the cover portion. More specifically, the piston member 170 may include a plate-shaped support portion 171 having a cross-sectional area equal to the area of the first vat portion 131, and a drive shaft 172 connected to a lower end of the support portion 171 to reciprocate the support portion 171. At this time, a motor controlling the movement of the drive shaft 172 may be further connected and disposed at the bottom end of the drive shaft 172, but it is preferably understood that it is omitted for the convenience of explanation.

Also, in the present invention, the resin receiving space 380 refers to the upper region of the support portion 171 of the first vat portion 170, that is, the space between the support portion 171 and the cover portion 133. Since the method of supplying the resin accommodated in the resin receiving space 380 of the present invention is that the user of the 3D printer 1000 fills the resin receiving space 380 before fastening the cover part 133, a separate resin supply pump or resin supply part other than the vat part can be omitted, thereby simplifying the structure of the printer.

Further, the cover portion 133 may comprise a multi-layer structure including a base portion 133-1 fixed to a wall surface of the first vat portion 131 and a variable portion 133-2 disposed on top of said base portion and sliding thereon.

Further, the base portion 133-1 is disposed at the same height as the top surface of a wall disposed between the first vat portion 131 and the second vat portion 132. Here, the wall body is a boundary surface disposed between the first vat portion 131 and the second vat portion 132 and is formed lower than the height of the vat portion 150 enclosure to function as a DLP focal length. At this time, the base portion 133-1 is formed smaller than the cross-sectional area of the first vat portion 131, so that a rectangular-shaped hole may be formed between the wall and the base portion 133-1. Here, the hole is configured to allow resin received in the resin receiving space 380 to be ejected outwardly by movement of the piston member 170. The size of the hole is shown to be less than half the cross-sectional area of the first vat portion 131, but the design can be easily modified according to embodiments.

Figure 4A:
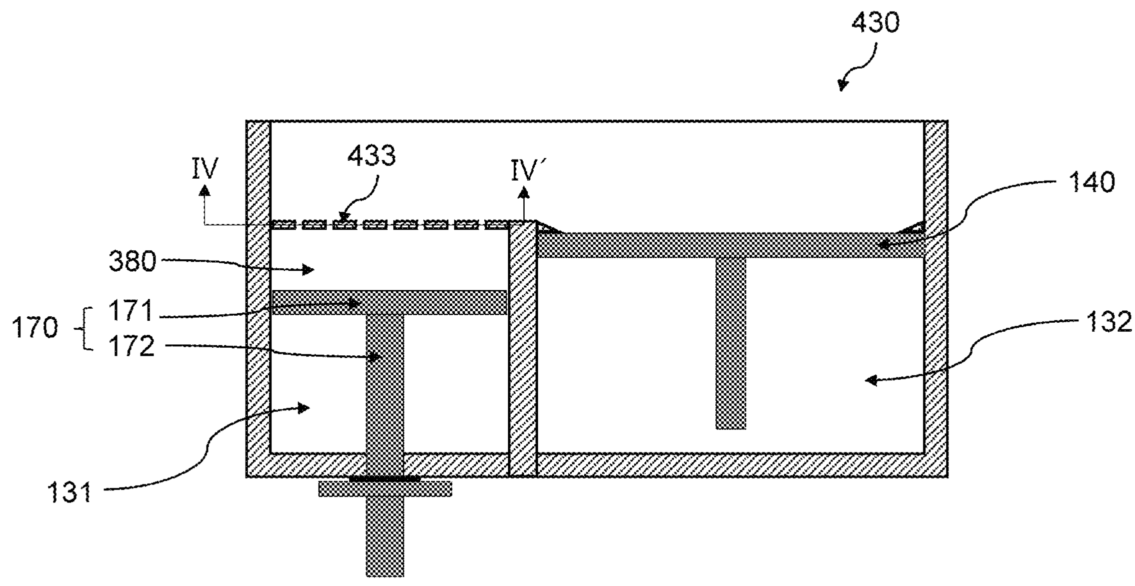
FIG. 4A is a cross-sectional view of a vat portion for a three-dimensional printer, according to another embodiment of the present invention.
Figure 4B:
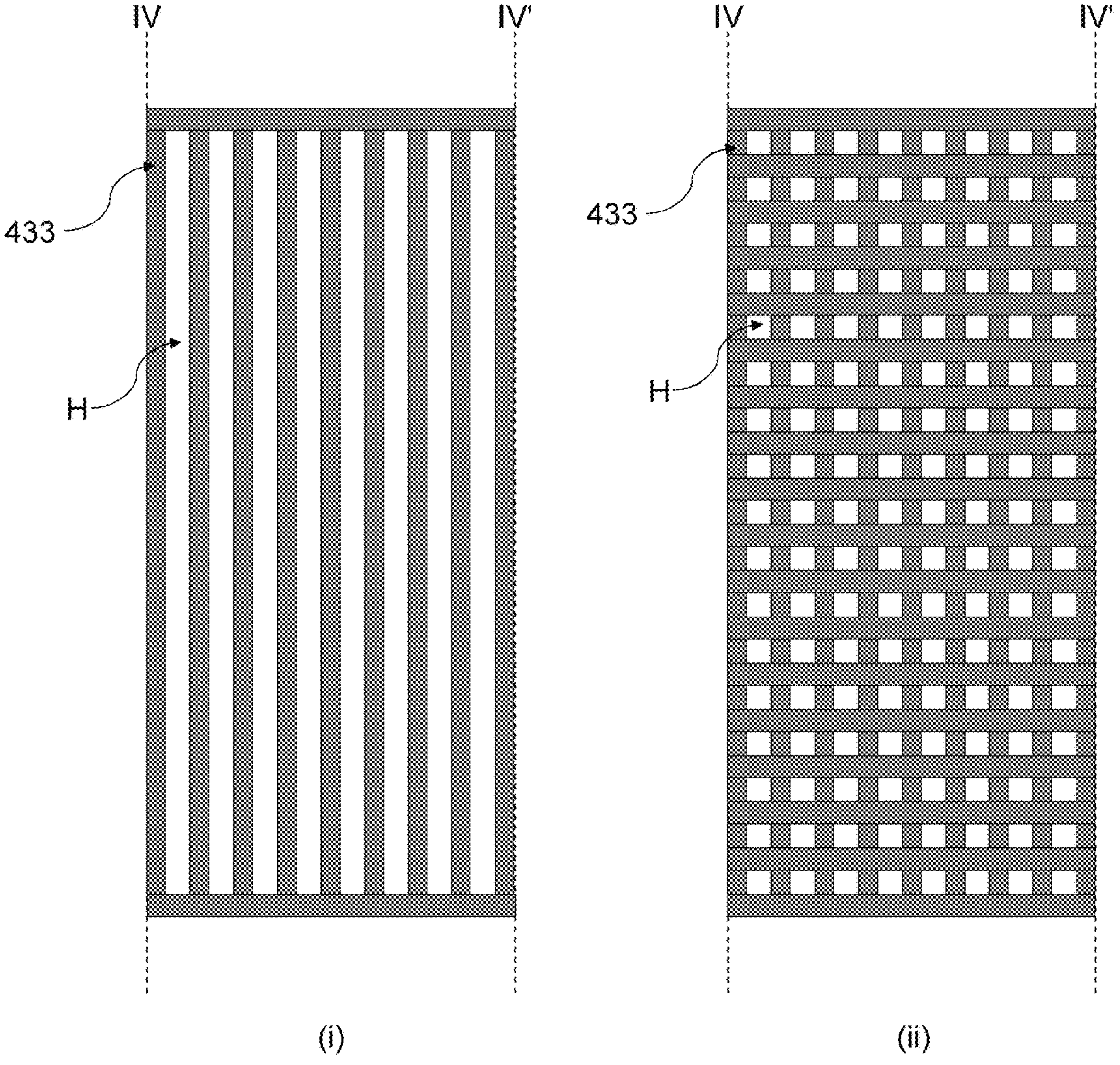
FIG. 4B is a plan view of a cover portion according to another embodiment of the present invention.

FIG. 4A is a cross-sectional view of a vat portion for a three-dimensional printer, according to another embodiment of the present invention. FIG. 4B is a plan view of a cover portion according to another embodiment of the present invention. The vat part shown in FIG. 4A differs only in the shape of the cover part disposed on the first vat part side of FIG. 3, but the rest of the configuration is substantially the same, so that a redundant description will be omitted.

Referring to FIG. 4A, a cover portion 433 having a plurality of holes formed in it may be disposed on top of the first vat portion 133-1. Through the plurality of microscopic holes formed in the cover portion 433, a high-viscosity resin can be ejected to the top in response to the reciprocating movement of the piston member 170.

The cover portion 433 may be in the form of a plurality of elongated, side-by-side holes, as shown in (i) of FIG. 4B, or in the form of a netting with a plurality of square-shaped holes, as shown in (ii). The cover portion may be formed of the same material as the vat portion 130, for example, aluminum, stainless steel, or iron.

While the cover portion 433 according to other embodiments has been described as consisting of a single layer, a filter layer may be further disposed at a lower portion of the cover portion 433 to filter out foreign matter contained in the resin that is returned to the resin receiving space 480 by the blade of the three-dimensional printer of the present invention. In this case, the filter layer may be a mesh net with holes formed that are smaller in size than the holes formed in the cover portion.

Figure 5:
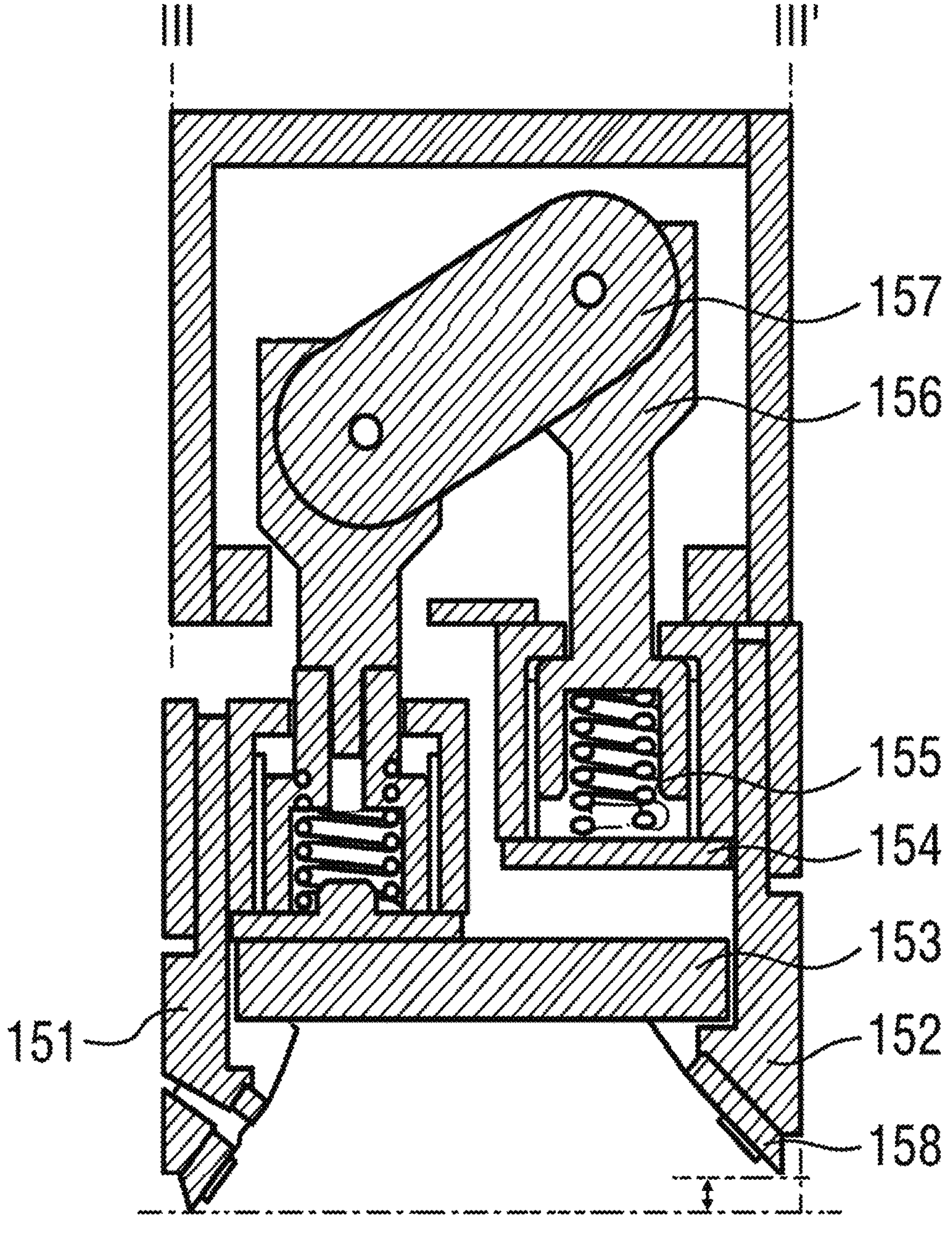
FIG. 5 is a cross-sectional view of a blade cut in the Y-axis direction according to one embodiment of the present invention.
Figure 6:
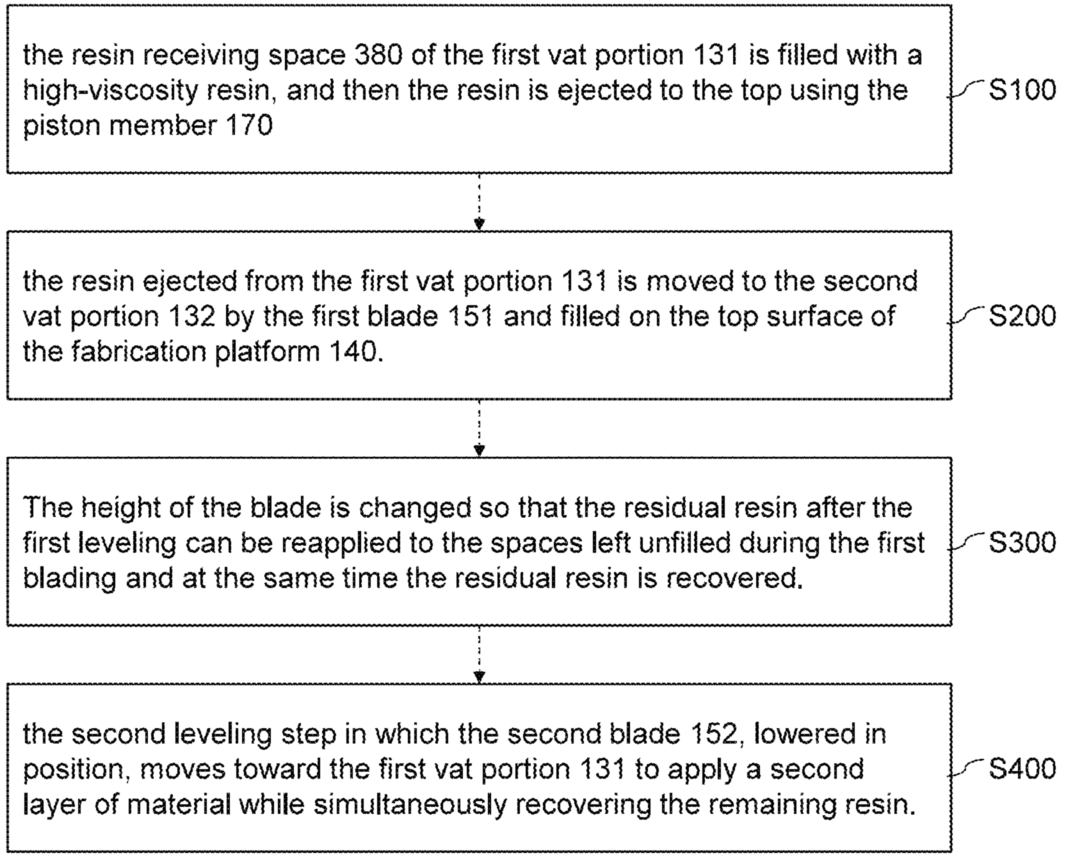
FIG. 6 is a flowchart to illustrate the operation of a three-dimensional printer according to one embodiment of the present invention.
Figure 7A:
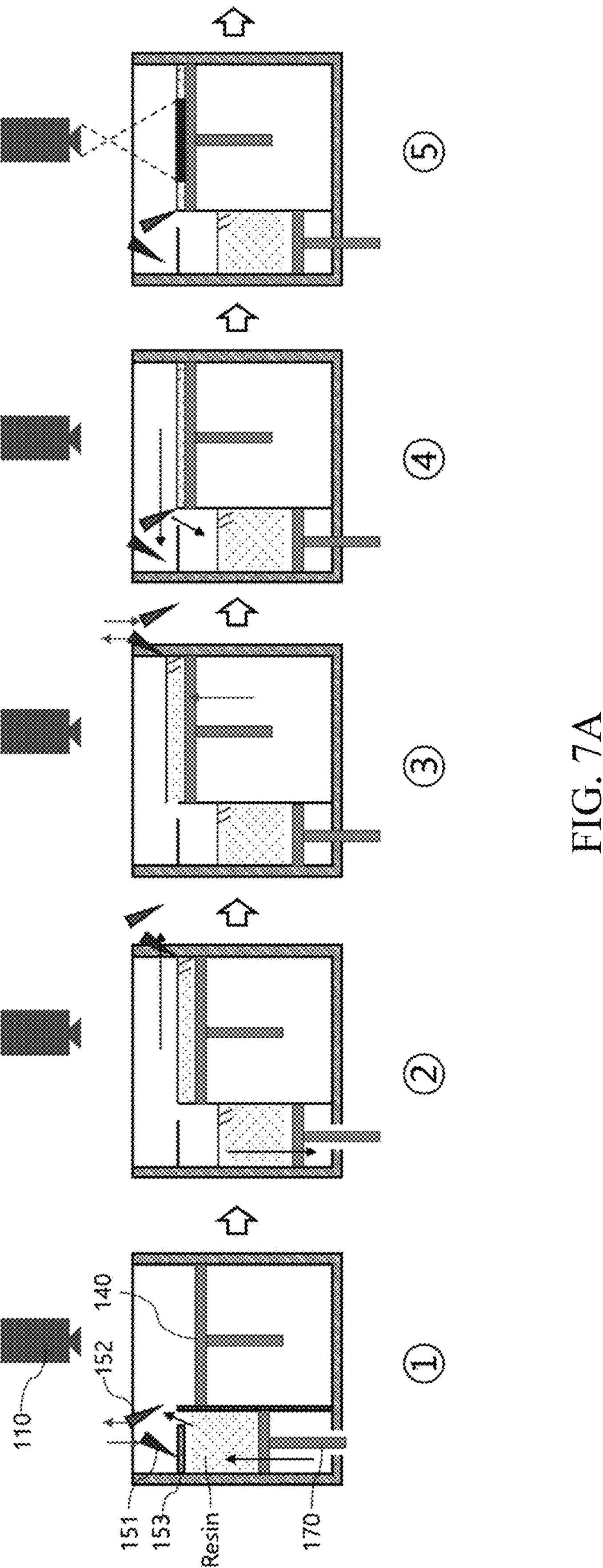
FIGS. 7A and 7B are example diagrams illustrating the operation of a three-dimensional printer according to one embodiment of the present invention.
Figure 7B:
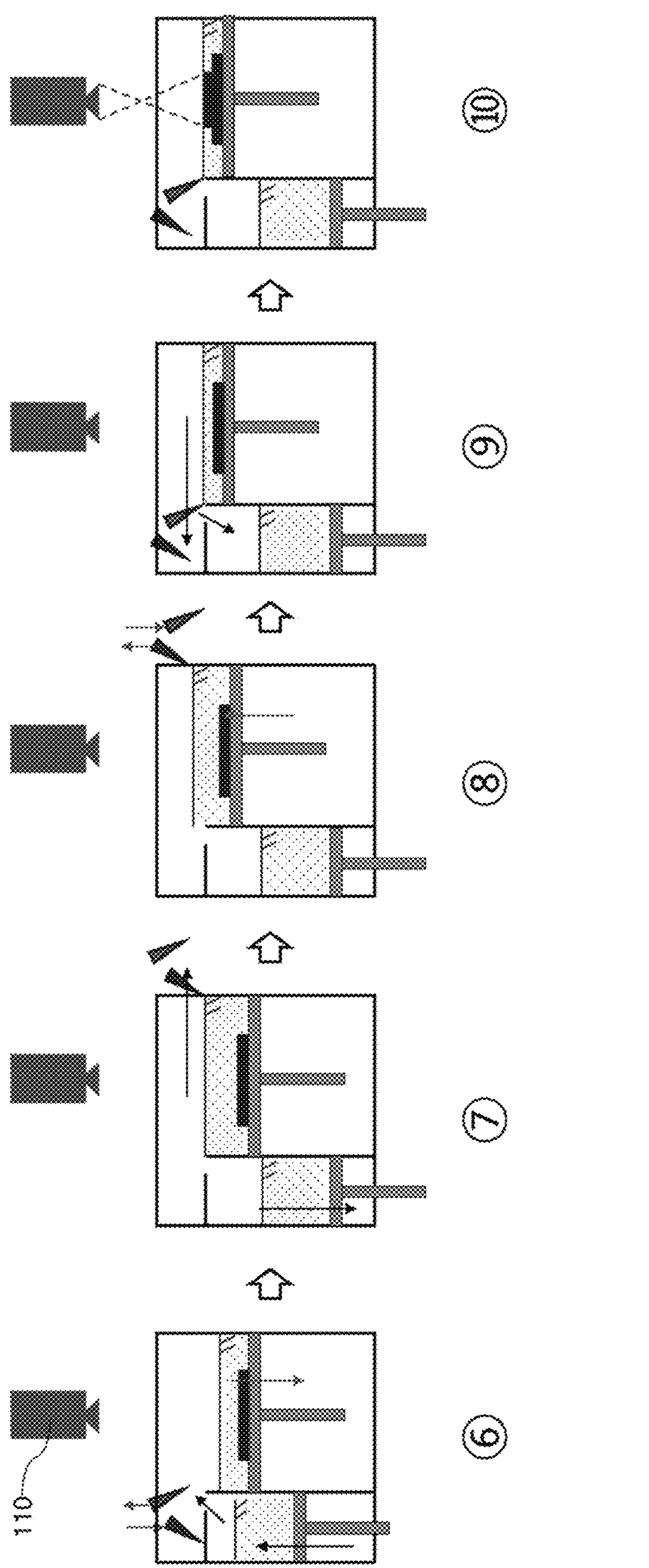

FIG. 5 is a cross-sectional view of a blade cut in the Y-axis direction according to one embodiment of the present invention. FIG. 6 is a flowchart to illustrate the operation process of a three-dimensional printer according to one embodiment of the present invention. FIGS. 7A and 7B are exemplary diagrams illustrating the operation process of a three-dimensional printer according to one embodiment of the present invention.

In step S100, the resin receiving space 380 of the first vat portion 131 is filled with a high-viscosity resin, and then the resin is ejected to the top using the piston member 170. At this time, it is preferably understood that the resin is filled manually by a user.

Then, in step S200 (hereinafter also referred to as the "first leveling step"), the resin ejected from the first vat portion 131 is moved to the second vat portion 132 by the first blade 151 and filled on the top surface of the fabrication platform 140. At this time, the fabrication platform 140 is lowered to a height for fabricating one layer, and the top surface of the resin filled on the fabrication platform 140 is first leveled by the first blade 151.

More specifically, in the first leveling step S200, material is fed with the first blade 151 descending and the second blade 152 rising, and leveling of the material surface is performed. At this time, as shown in ① and ② of FIG. 7A, it can be seen that the leveling by the first blade 151 is accomplished by passing over the surface of the resin filled on the upper part of the production platform 140 as the blade portion 150 moves toward the second vat portion 152 with the DLP focal length fixed on the wall surface disposed between the first vat portion 151 and the second vat portion 152 while moving toward the second vat portion 152.

In this case, the first blade 151 can be moved while applying resin through an edge surface having a predetermined angle, and the second blade 152 can be raised by the crankshaft 157 to a height that is spaced apart from the top of the material so that it is not involved in applying the material. Here, the edge surface of the first blade 151 is at an acute angle to the horizontal direction, so that it can be moved while wrapping all the resins. On the other hand, the amount of resin filled on the production platform 140 in step ② of FIG. 7A may be slightly more than the amount for curing a single layer for the accuracy of production, since the characteristics of the light-curing resin having a high viscosity may cause bubbles to form even if it is applied by sliding the blade. In other words, the purpose of the first leveling step (S200, hereinafter also referred to as the "first blading step") is to apply hundreds of μm of resin in order to cure and stack a layer of tens of μm.

Then, in step S300 (hereinafter also referred to as the "blade height change step"), the first blade 151, which has completed the first leveling operation, is raised upward as shown in ③ of FIG. 7*a*, and the second blade 152 is lowered downward so that the residual resin after the first leveling operation is recovered while reapplying material to the space that was not filled during the first blading process. At this time, the second blade 152 is set to descend to the height of the top surface of a wall disposed between the first and second blades 151 and 152, which can be understood as the DLP focal length of the blade. At this time, the first blade 151 may be understood to maintain an elevated height such that there is no interference with the resin.

Further, in step S300, the fabrication platform 140 is cured in step S200 such that the top surface of the stacked layer is raised by a height parallel to the top surface of the wall.

Referring to FIG. 5 to explain the movement of the blades in more detail, the movement shaft 156 is moved linearly in the up and down direction by the crankshaft 157 when the first blade 151 rises and the second blade 152 descends. At this time, the movement shaft 156 is characterized in that it is moved by the spring 155 disposed on the inner side of the lower end of the movement shaft 156. As the movement shaft 156 moves in the up and down direction, the block 154 wrapping the lower end of the movement shaft disposed at the lower end moves the height adjustment form 153 disposed at the lower end in the up and down direction, so that the first and second blades 151, 152 can be moved in the up and down direction.

Then, in step S400 (also referred to herein as the "second leveling step"), the second blade 152, which has been lowered in position, moves toward the first vat portion 131 to apply a second layer of material while simultaneously recovering the remaining resin. At this time, the final height of the resin filled in the upper portion of the fabrication platform 140 may be such that one layer can be built. Thus, as the top surface of the resin is secondarily bladed through step S400, as shown in step ④ of FIG. 7*a*, a finished layer can be fabricated in step ⑤.

FIGS. ⑥ to ⑩ of FIG. 7B are illustrative examples of repeating the same process as described above to produce a second layer, which will not be described in detail.

On the other hand, the pair of blades of the present invention has a heating member 158 disposed on the edge surface, which has the effect of temporarily increasing the fluidity of the resin in the process of applying or recovering the high-viscosity resin. Therefore, when the heating member 158 of the first blade 151 temporarily increases the temperature of the resin touching the edge surface in the step S200 of first blading, the high-viscosity resin can be easily moved to the second vat portion 132. Furthermore, the heating member 158 of the second blade 152 temporarily heats the resin in contact with the edge surface in the second blading step S400 so that it can be effectively bladed, thereby effectively recovering the material and increasing the manufacturing completeness of the structure.

The heating member 158 disposed at the edges of the blades 151, 152 may be a plate-like heat conductor, as shown in FIG. 5. In FIG. 5, the thickness of the heating member 158 is shown as thick for ease of understanding, but it is preferably understood to be in the form of a very thin conductor plate or conductor wire.

As such, the present invention can effectively feed and recover material during the process of blading high viscosity resins by a pair of tilt blades 151, 152 including a heating member 158.

The present invention may simplify the construction of printers that handle higher viscosity resins by adapting a vat to a three-dimensional printer that utilizes a piston member 170 to feed material and store the recovered material.

The present invention can minimize bubbles on the surface of the material by performing the blading operation by temporarily raising the high-viscosity resin with the blades 151, 152 intersecting along the direction of movement.

Since the two blades 151, 152 are tilted with respect to different directions to apply and retrieve material, the present invention eliminates the need for a separate material retrieval section, thereby simplifying the structure and improving the productivity of the three-dimensional printer 1000.

The present invention can speed up the fabrication of a workpiece because the feeding and retrieval of material occurs at once when the first blade 151 applies the material and the second blade 152 reapplies and retrieves the material, with the top surface of the material reciprocating between the two blades in a single pass.

Furthermore, the present invention can improve market competitiveness by minimizing product manufacturing failures.

Therefore, the present invention can solve the conventional problem that as the blade that applies the material and the blade that recovers the residual resin after curing operate sequentially, the high viscosity resin on the back of the blade causes the resin to fall on the pre-laminated material layer during the photopolymerization reaction and cure to a higher-than-normal height. This prevents the problem of cracking due to the collision of the blade with the pre-cured material layer, thus maximizing the production success rate.

Embodiments of the present invention have been described in more detail with reference to the accompanying drawings, but the present invention is not necessarily limited to these embodiments and may be practiced in various modifications without departing from the technical ideas of the present invention. Accordingly, the embodiments disclosed herein are intended to illustrate and not to limit the technical ideas of the invention, and the scope of the technical ideas of the invention is not limited by these embodiments. Therefore, the embodiments described above should be understood as exemplary and non-limiting in all respects. The scope of protection of the present invention shall be construed in accordance with the following claims, and all technical ideas within the scope of such claims shall be construed to be included in the scope of the present invention.

The invention claimed is:

1. A vat for a three-dimensional printer for handling high viscosity resin, the vat comprising:

a first vat portion including a resin receiving space, and a piston member that is configured to push resin received in the resin receiving space upwardly through at least one hole formed in a cover portion;

a second vat portion disposed on one side of the first vat portion and including a fabrication platform configured to support a structure fabricated using resin supplied from the first vat portion; and a blade portion configured to reciprocate between one side of the first and second vat portions and the other side of the first and second vat portions, wherein the blade portion includes a first blade and a second blade, the first and second blades including blade edge surfaces inclined at a predetermined non-vertical angle in a direction symmetrical to each other, wherein a digital light processing (DLP) focal length is fixed to a top surface of a wall disposed between the first vat portion and the second vat portion, and wherein the blade edge surfaces include a heating member extending along a longitudinal direction of the blade edge surfaces to heat said resin that is applied or recovered during a blading process of said blade portion.

2. The vat of claim 1, wherein the piston member includes:

a support portion formed in the form of a plate having a cross-sectional area equal to an area of the first vat portion and configured to support a resin received in the resin receiving space; and a drive shaft connected to a bottom portion of the support portion to raise and lower the support portion to a height of a bottom surface of the cover portion.

3. The vat of claim 1, wherein the first blade is configured to feed resin ejected from at least one hole onto the fabrication platform provided in the second vat portion, wherein the second blade is configured to recover residual resin that remains after application by the first blade and curing into the hole formed on a top side of said first vat portion.

4. The vat of claim 1, wherein the cover portion is formed as a multilayer structure including a base portion; and a slidable portion disposed on top of the base portion.

* * * * *